United States Patent [19]

Sims, Jr. et al.

[11] 4,308,536
[45] Dec. 29, 1981

[54] ANTI-COLLISION VEHICULAR RADAR SYSTEM

[75] Inventors: John C. Sims, Jr., Sudbury; John B. Flannery, Chelmsford, both of Mass.

[73] Assignee: Collision Avoidance Systems, Newport, R.I.

[21] Appl. No.: 15,322

[22] Filed: Feb. 26, 1979

[51] Int. Cl.³ ............................................. B60T 7/12
[52] U.S. Cl. .............................................. 343/7 VM
[58] Field of Search ................................... 343/7 VM

[56] References Cited

U.S. PATENT DOCUMENTS

| | | | |
|---|---|---|---|
| 3,337,866 | 8/1967 | Gisonno | 343/7 VM |
| 3,978,481 | 8/1976 | Angwin et al. | 343/7 VM |
| 4,072,945 | 2/1978 | Katsumata et al. | 343/7 VM |
| 4,104,632 | 8/1978 | Fujiki et al. | 343/7 VM |
| 4,146,891 | 3/1979 | Fujiki et al. | 343/7 VM |
| 4,148,028 | 4/1979 | Fujiki | 343/7 VM |
| 4,158,841 | 6/1979 | Wüchner et al. | 343/7 VM |

Primary Examiner—T. H. Tubbesing
Attorney, Agent, or Firm—David G. Conlin; Robert F. O'Connell

[57] ABSTRACT

The present invention includes an anti-collision vehicular radar system which incorporates a microprocessor. The system provides a warning of a potential collision of the vehicle with other vehicles or objects in the path of the vehicle and automatic braking. More particularly, the present invention utilizes a pulsed radar system with overlapped antenna beams for off-axis object discrimination which determines the pattern of the change in relative velocity of the vehicle and the object which is detected by its radar to provide signals which are processed by a microprocessor and associated digital circuitry to determine whether the detected object is a potential obstruction which must be avoided by braking or maneuvering of the vehicle.

10 Claims, 5 Drawing Figures

ANTI-COLLISION VEHICULAR RADAR SYSTEM

BACKGROUND OF THE INVENTION

Many radar systems for the prevention of vehicular collisions with objects in the path of travel of the vehicle have been designed and to a large extent have been moderately successful in warning the driver or automatically braking the vehicle to prevent collisions. The report, "Analysis of Problems in the Application of Radar Sensors to Automotive Collision Prevention", by R. A. Chandler et al, Institute of Telecommunication Sciences, March 1975, distributed by the National Technical Information Service of the U.S. Department of Commerce, discloses some of the problems with existing systems. Prior art systems have a number of problems among which are the high false alarm rate generated by the detection of non-hazardous targets, the loss of target because of multipath signal cancelation, and blinding which is caused by other vehicles having a radar system similar to that of the driven vehicle. The radar system of this invention is directed towards the solution of these and other problems.

SUMMARY OF THE INVENTION

It is therefore a primary object of this invention to provide reliable warning of an impending collision in sufficient time to allow the vehicle driver to take action to avoid the collision and/or to activate automatic braking.

Other objects of the present invention are to provide a reliable collision advoidance system which significantly reduces the problems of false target response, multipath signal cancellation, and blinding from other radar equipped vehicles.

It is a further object of this invention to provide a system which is lightweight, of small size, and relatively inexpensive in comparison with prior art warning systems and easily installed in a vehicle.

Another feature of this invention is the ability to space the vehicles at a safe distance dictated by the ground speed of the vehicles.

Another feature of the invention is the ability to lock up the brakes until a predetermined code is entered on the keyboard attached to the microprocessor. Alternately, a key switch can be used for this prupose to prevent releasing of the brakes until a matching key is inserted in the lock.

Among the features of this invention which causes it to achieve the above-stated objects are the use of pulsed radar in conjunction with a target discriminating antenna system, and digital processing of the range gated received signals by a microprocessor and associated digital circuitry.

The above-described features and objects are accomplished by a vehicular anti-collision system which includes a pulsed radar system having overlapping antenna beams to discriminate objects which are off-axis from the path of the vehicle. The system monitors the pattern of change in relative velocity between the vehicle and an object detected by the pulsed radar, and in response to a pattern of relative velocities indicating a potential collision, an output signal is provided for warning a driver or for automatically initiating braking action.

Each time the vehicle travels a predetermined distance, the radar is pulsed. Circuitry is provided which detects reflections from objects in a plurality of range gate intervals extending in front of the vehicle. In the described embodiment, there are 32 range gate intervals, each 10 feet in length. The received signal for each 10 foot range gate is a binary bit representing the presence of an object within that range gate. The number of radar pulses emitted during the time a detected object remains in a single range gate interval represents the relative speed between the object and vehicle.

The relative speed of an object is stored for each range gate interval through which is passes. For stationary objects, small variations in the relative speed are monitored to determine whether the object is in the path of the vehicle or is laterally displaced from the line of travel of the vehicle. An object dead ahead shows no variation in observed relative speed and may represent a potential collision hazard, while an object not directly in the path of the vehicle will show a characteristic variation in observed speed as it passes through the range gate interval.

DESCRIPTION OF THE DRAWINGS

These and other objects and features of this invention will become apparent from the following detailed description of the invention when read in conjunction with the following figures.

DESCRIPTION OF THE PREFERRED EMBODIMENT

This system will be described with specific values for the frequency, the number of range gates, the width of the range gates, the number of pulses per range gate, the beam width and overlap and boresight angle and the amount of travel of vehicle between successive radar pulses. However, it should be understood that these and other values are only illustrative.

Figure 1:
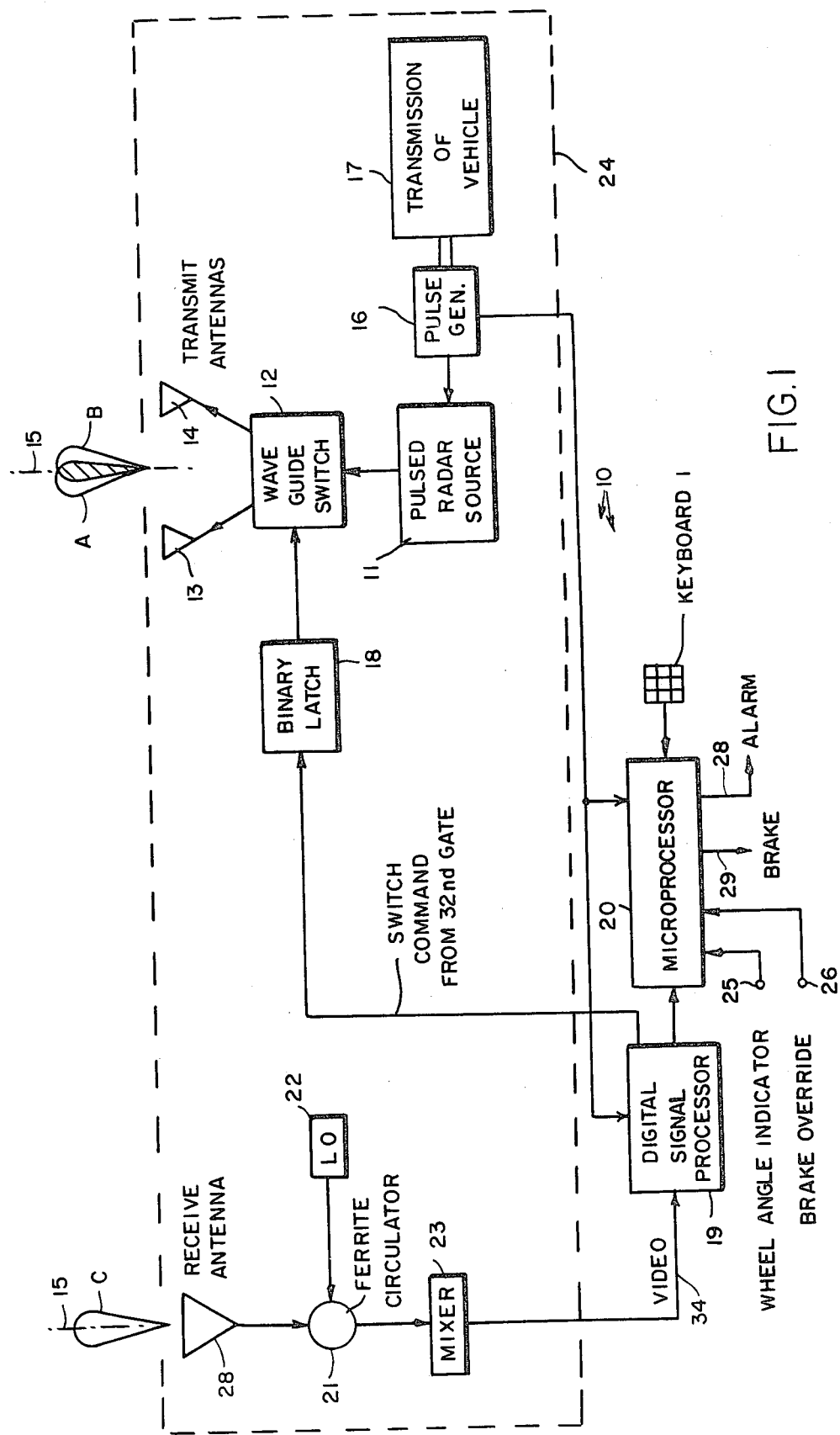
FIG. 1 is a block diagram of the system of this invention.

The system operates with a pulsed radar at 24 GHz, polarized at an angle of 45°, in conjunction with a microprocessor. The block diagram contained in FIG. 1 illustrates the operation. A system pulse commands the radar to transmit a pulse on one of two transmitting antennas and sets the time for the receiver to view the window of one of 32 range gates, each 10 feet in length. Each pulse, approximately 20 nanoseconds wide, is directed by means of a diode switch to the appropriate antenna. The two antennas are boresighted either side of the center line, for instance 3°. The Gunn oscillator radar transmitter is pulsed from a drive connected to the vehicle transmission that gives a pulse every ⅛ inch of travel. This pulse triggers the Gunn oscillator at a peak power of 10 watts at a pulse width of 20 nanoseconds. The transmit antennas are strobed alternately by the switch so that a complete cycle of two scans is completed for every quarter inch of travel. The trigger pulse is preferably jittered by an amount sufficient to cause the radar of another similarly equipped vehicle to only infrequently provide a pulse in the 32 range gate interval.

The received signal for each 10 foot range gate is a binary bit representing the energy reflected from all objects within that range gate. These signals are stored in memory and compared with the next scan that occurs during the period in which the vehicle traverses 10 feet as measured by the speedometer sensor. The measurement of distance by pulse pick up on the speedometer cable need not be precise, only consistent, for control of the microprocessor. The detection of velocity changes is made by measuring the number of received pulses from a target in a range gate.

One method for signal analysis is to acquire the number of received pulses from each of the 32 different range gates, store the data in the memory, and then compare the new data from the next scan with corresponding previously acquired data. Velocities are expressed as a precent of vehicle speed. Use of the change in velocity of the perceived objects relative to that of the vehicle as a control criterion makes actual velocities of objects and the vehicle unimportant.

Variations in speed are compared with values similar to those shown in Table I which shows the apparent velocity of the vehicle with respect to a non-moving target expressed as percent of the velocity of the vehicle as a function of distance to the target and the displacement of the target from the center line (or line of travel) of the vehicle.

TABLE 1

VELOCITY OF OBSERVED OBJECTS
(Expressed as a percent of the velocity of the vehicle)

| RANGE IN FEET | | | | | |
|---|---|---|---|---|---|
| 320 | 99.9 | 99.7 | 99.6 | 99.4 | 99.1 |
| 300 | 99.8 | 99.7 | 99.5 | 99.3 | 99.0 |
| 280 | 99.8 | 99.7 | 99.4 | 99.2 | 98.8 |
| 260 | 99.8 | 99.7 | 99.4 | 99.1 | 98.6 |
| 240 | 99.8 | 99.6 | 99.3 | 98.9 | 98.9 |
| 220 | 99.8 | 99.5 | 99.1 | 98.7 | 98.1 |
| 200 | 99.7 | 99.4 | 99.0 | 98.4 | 97.7 |
| 180 | 99.7 | 99.3 | 98.7 | 98.0 | 97.2 |
| 160 | 99.6 | 99.1 | 98.4 | 97.5 | 96.4 |
| 140 | 99.4 | 98.8 | 97.9 | 96.8 | 95.4 |
| 120 | 99.3 | 98.4 | 97.2 | 95.6 | 93.7 |
| 100 | 99.0 | 97.7 | 96.0 | 93.7 | 91.0 |
| 80 | 98.4 | 96.4 | 93.7 | 90.2 | 85.9 |
| 60 | 97.2 | 93.7 | 88.8 | 82.6 | 75.0 |
| 40 | 93.7 | 85.9 | 75.0 | 60.9 | 43.7 |
| 20 | 75.0 | 43.7 | — | — | — |
| | 10 | 15 | 20 | 25 | 30 |
| | DISPLACEMENT FROM CENTER LINE IN FEET | | | | |

The information of Table I is effectively stored in the microprocessor memory. A stationary object, dead ahead, will show no variation in observed speed (a fixed pulse count of 960 pulses per 10 foot range gate will be detected) and may represent a potential collision hazard depending upon the range and closing rate. An object not directly in the path of the vehicle will show a variation in observed speed in the 10' range intervals. The object is not being approached directly, and thus the rate of closure changes. The successive distance differences are shorter than those along the straight ahead path. For example, an object displaced 20 feet on either side of the center line will show an observed variation of 99.6 percent (a pulse count of 964) at a range of 320 feet. The same object at 160 feet, assuming a straight line of travel of the vehicle will show a variation of 98.4 percent (pulse count 975); at 80 feet, 93.7 percent (pulse count 1024).

A second processing provided by the circuitry is the comparison of the returned echoes from the alternate scans. The presence of a target in the same range gate on the left scan and the right scan and providing signal strength on each scan above a predetermined value indicates a target on the center line of travel. A target in one scan and not the other indicates a target off the center line of vehicle travel.

1. Target Discrimination

One critical problem in the design of a collision avoidance radar is that of identifying the objects along the roadside and overhead as being different from objects in the roadway ahead of a vehicle. Stationary objects directly ahead will apear as signal at the same velocity as the vehicle. The closing speed will equal the vehicle speed. Moving objects will appear as a signal at a different velocity; a higher velocity for objects approaching the vehicle, a lower velocity for objects being overtaken by the vehicle. Stationary objects to one side or overhead will return echoes of reduced speed (higher pulse count) due to the changing angle of observation as can be seen in Table I. The reduction of closing velocity will be proportional to the $\sin^2$ of the angle of observation.

False targets—that is, objects which do not pose a threat of collision—are examined and rejected as follows. The radar has three antennas; two transmitter antennas are boresighted 3° to either side of the center line of the vehicle and the receive antenna is aligned with the center line of the vehicle. Fifty feet ahead of the transmitter, the half power points of the beam is 8.5 feet in diameter. At 320 feet ahead, it is 56 feet in diameter. By angling each transmit antenna 3° off center, at 320 feet the overlap is 17.5 feet. A target appearing in both beams is a target on a collision course. Objects with sufficient reflectivity within the cone will return echoes. Side lobes may illuminate targets outside the cone.

In order to eliminate response to observed but false targets, the microprocessor software establishes a virtual cylinder of a constant diameter extending along the line of travel. Objects outside this cylinder do not pose a threat of collision. The microprocessor discriminates between these objects in the beam overlap region by effectively comparing relative speeds established during successive field scans with information similar to those shown in Table 1. It further compares the presence of an echo in one beam and not in the other to flag the target as non-hostile. The signal in both beams and a constant relative velocity in all ranges indicates a collision course with the target.

Suppose, for instance, the radar observes an object in the 32nd range gate at 99.1 percent of vehicle speed (a count of 969). It could be a stationary object 30 feet from the line of travel of the radar equipped vehicle or it could be another slowly moving vehicle dead ahead. If, after the 5th gate transition, the relative speed is determined to be 98.1 percent, and the object reflects energy from only one beam, then the microprocessor will identify the object as harmless to the vehicle's direction of travel as it is indeed 30 feet away from the center line.

Objects having relative velocities above 100 percent are oncoming traffic. Objects moving away from the vehicle are not observed by the microprocessor because they are moving negatively through the range gates.

On narrow, two-lane roads, closing speeds of 120 M.P.H. could represent two vehicles approaching each other at 60 M.P.H. In this case, the values in Table I are utilized to indicate an impending collision or passing in an adjacent lane. For instance, an observed closing speed of 118.9 M.P.H. (count of 484) in the 32nd range gate and 116.64 M.P.H. (count of 494) in the 18th range gate would indicate two vehicles passing within 30 feet of each other. Successive scans would verify this situation, showing reduced relative velocity. However, if successive scans indicated a constant relative velocity, a head-on collision would be imminent and braking and/or warning would be initiated.

2. Multipath Cancellation

Multipath signal cancelation causes unpredictable and critical loss of braking at certain times when such braking was essential to avoid a collision. Multipath cancellation is caused by microwave energy bouncing off the road or other surfaces and uniting in and out of phase with the direct path energy. Received microwave energy can either be cancelled with a loss of all information or received with a buildup of power. The system of this invention solves this problem simply by using its memory storage. The information from each successive range gate is recorded, is indexed by one, and then compared. If a true target has been identified in a range gate and disappears on the next scan, the microprocessor assumes that the object is still there until a subsequent scan proves otherwise. This procedure minimizes the effect of multipath signal cancellation.

3. Blinding

Blinding (interference with the operation of a system equipped vehicle from the radar transmission of other similarly equipped vehicles) can occur theoretically from such vehicles approaching from ahead or from echoes of transmission from such vehicles traveling in the same direction. For such blinding to occur, two or more vehicles must have the same pulse timing. Interfering pulses occur in a random manner and their duration is less than 1 percent of the time during which the 32 range gates are active. The polarization at 45° reduces the signal strength from oncoming vehicles to approximately the same strength as reflected signals from vehicles traveling in the same direction. Because of these factors, the probability of interference being perceived by the microprocessor is extremely low. When the fact that the information from about 960 pulses is averaged by the microprocessor to detect the presence or absence of a target in a particular range gate and that there are 32 range gates, it is readily apparent that the probability of interference is so low as not to be a problem.

4. Anti-theft

When the ignition switch is turned on and the motor is running, the brakes will become fully applied by command of the microprocessor until a multidigit code is correctly entered on a keyboard 1. This feature utilizes the microprocessor and is provided to prevent theft. This feature is not necessary to the invention and may be disconnected or implemented by use of a key instead of a coded keyboard.

The anti-collision vehicular radar system 10 of this invention is shown in block diagram form in FIG. 1. The radar portion 24 of the system 10 comprises a pulsed transmitter 11 whose output pulses are successively switched by waveguide switch 12 to the transmit antennas 13 and 14. The transmit antennas 13 and 14 provide antenna beams A and B respectively which make an angle of approximately 3° with respect to the center line 15 of the vehicle. Each antenna beam width is 10° wide. The pulsed radar source 11 is pulsed by a pulse generator 16 to provide a transmit pulse of approximately 20 nanoseconds which gives a range resolution of approximately 10 feet. Typically, the pulsed radar source 11 is a Gunn type pulsed oscillator having approximately 10 watts peak power and a frequency of 17 GHz. The pulse generator 16 is mechanically connected to the vehicle transmission 17 in a manner which produces one output pulse from the pulse generator from every ⅛ inch of travel of the vehicle. The design of such a pulse generator is well known to those skilled in the art and typically comprises a disc which is mechanically rotated by the vehicle transmission. The disc is interposed between at least one light source and at least one photodetector to energize the photodetector as transparent spots in the disc allow light to impinge upon the detector to produce the pulses which energize the radar source. The waveguide 12 is caused to switch the pulsed radar alternately between antennas 13 and 14 by a signal received from the binary latch 18 which in turn is actuated by a signal from the digital signal processor 19 which signal occurs shortly after the last range gate of interest which will be explained in detail subsequently.

The receiver antenna 28 has its boresight aligned with the axis of the vehicle to provide a beam C directed along the path of travel of the vehicle. The receiver circuitry is conventional in that the antenna 28 provides a signal to a ferrite circulator 21 to which is added the signal from a local oscillator 22. These signals are mixed, amplified, and detected in mixer 23 to provide a video signal input to the digital signal processor 19. The digital signal processor 19 is provided with a timing pulse by the pulse generator 16 and provides processed video signals as inputs to the microprocessor 20. Microprocessor 20 also receives wheel angle data on line 25 and brake override data on line 26, which inputs are described in more detail below in connection with FIG. 2. The microprocessor 20 responds to these processed digital signals from processor 19 to provide an audible alarm signal when the system 10 indicates that there is a target or object located in the path of travel of the vehicle with which a collision is imminent unless evasive action is taken by the driver of the automobile or braking is applied. Typically, the transmitting antennas 13 and 14 and receiving antenna 20 are planar printed circuit types which are commercially available. Horn type antennas are alternatives.

Figure 2:
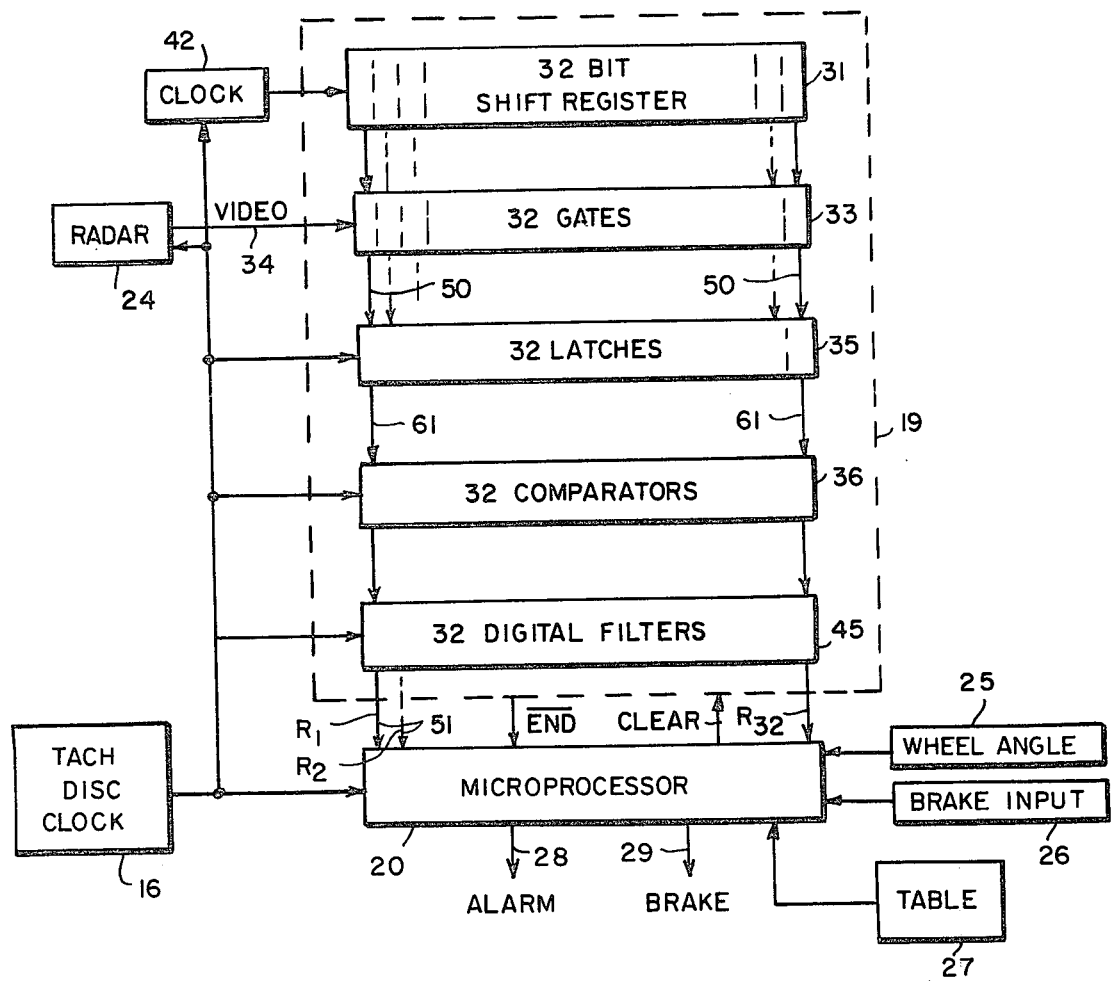
FIG. 2 is a block diagram of the digital signal processor.

The block diagram of FIG. 2 shows the radar 24 of FIG. 1 feeding information to 32 range gates 33 of the digital signal processor 19. The radar and all other elements of the system are operated from a tach disc clock (pulse generator) 16 which controls another clock 42 which produces shift pulses to a 32 bit shift register 31. When the tach disc clock 16 provides a pulse which fires the radar transmitter 11, it also starts the clock 42 and shifts a true bit down the shift register 31 to sequentially open the 32 gates 33 one by one so that the radar video signal 34 which is fed to all these gates is gated out on 32 lines 50 corresponding to 32 ranges. When a video signal greater than a threshold level from a target appears in one of the ranges, a bit comes out from the corresponding gate 33 to "set" a corresponding one of 32 latches 35; the output lines of each of latches 35 go to each of 32 signal comparators 36. For two successive signals received in a range gate after pulsing antennas A and B, the corresponding comparator provides a logical one output to a corresponding one of 32 digital filters 45. Each one of the 32 filters 45 has a flag output line $R_1$, $R_2$, ... $R_{32}$. Each flag output line becomes TRUE whenever a target is present in that particular range. All 32 lines $R_1$, $R_2$, ... $R_{32}$ go to a microprocessor 20 where the number of pulse generator 16 pulses in each range interval are counted during the time that its range flag input is TRUE. In the microprocessor the count in each range interval is processed to provide target information as described in more detail subsequently.

Microprocessor 20 also receives wheel angle information from an input 25 and brake pedal operation information from an input 26 as well as information from a table memory 27 which will be described subsequently. The microprocessor 20 has two outputs, an alarm output 28 and a brake output 29. Thus the microprocessor 20 processes the information from the 32 flags and in the event of imminent collision can give either an audible alarm and/or an application of the brakes. The table memory 27 contains information which is used in conjunction with wheel angle 25 information to determine how far the range is useful when negotiating a curve.

More specifically, when the automobile is on a curve the receiving antenna boresight crosses the center line of the road at a range dependent on the sharpness of the curve and information beyond that range is not used in the detection system. The received information is stored in a table and the wheel angle information provides an address in that table which directs the computer to ignore all data beyond the range gate where the boresight crosses the center line of the road. Alternatively, the wheel angle information may be used to increase the shift frequency of oscillator 42 (as by a voltage controlled oscillator) to thereby reduce the distance over which each range gate receives radar signals so that the 32 range gates cover the lesser total distance to the curving road center line.

As stated previously, there are 32 flag inputs to the microprocessor as shown on the block diagram of FIG. 2. Each individual flag is handled in the processor to determine whether that flag is up or down. When the flag goes up, a range count is started to accumulate pulses from the system clock 16 in a range counter register in the microprocessor, which corresponds to that particular range, and continues to accumulate counts until the range flag goes down at which point the range count stops. When the range count stops, the information from the range counter is transferred to a temporary store. The number which is accumulated in the range counter register will be a function of the velocity of the target which was detected in that range. Nominally, for a stationary object which is dead ahead, the accumulation of clock pulses will correspond to the number of pulses generated by the tach disc as the vehicle passes through that range. In the present embodiment the count is 960 pulses or one every eighth of an inch of forward motion regardless of the velocity of the vehicle.

If a target is within the beam overlap region and falls within one of the range gates, it will be in one of five "threat" statuses with respect to the vehicle. If the target is stationary and on axis with the path of travel of the vehicle, the number of counts (transmitter pulses) detected in each range gate will be invariant (a constant nominal count of 960 for the assumed operating conditions) and the range gate in which the target signal occurs moves in toward the vehicle. If the target has motion of its own toward the vehicle, the count in each range gate is less than the nominal 960 and if on axis the count is invariant. If the target is moving at the same speed and in the same direction as the vehicle, the range gate in which the target occurs will tend to accumulate a count tending toward infinity. If the target is moving slower than and in the same direction as the vehicle, the count in each range gate is greater than the nominal 960 and if on axis, the count will be invariant. If the target is moving faster than the vehicle and in the same direction as the vehicle, the target moves out in the range gates and is not a threat. The microprocessor takes the count for each range gate whose flag is "true" as stated previously and makes the necessary storage and comparisons to determine the "status" of each target.

The foregoing has been concerned with the processing of the data for individual range gates. The next step in the process is to identify targets and to track the targets through the range gates as a means of determining whether the apparent target is a threat or not and whether or not it is necessary to sound an alarm. A target appearing in a range gate is presented to the microprocessor as a "true" signal output of the digital filter corresponding to that range gate. Clock pulses presented as another input to the microprocessor allows the microprocessor to obtain a count corresponding to the passage of the target through the range gate. If the target is a "new" target, the microprocessor establishes the target as an "item" in a section allocated to an item of microprocessor memory. The range gate and count in that range are stored as "first" data under that item. The microprocessor on the basis of the "first" data makes a prediction of a range gate or gates and/or the count in each gate. This prediction is compared with a subsequently received range gate number and count. If this subsequent range gate number and count compares to the prediction it is assumed that the target is the same as has been observed previously, and the data is added as "second" data for the item which has already been allocated a region of memory and a new prediction is generated, and so on to provide a table of range gate numbers and corresponding counts from which the decision is made as to the character of the target in accordance with the target status analysis of the preceding paragraph.

If from this range and count it is determined that it is not "second" data on an already established item, a "second" item is established in a portion of the microprocessor memory and used for prediction and analysis of data associated with it to determine its status as a threat or as harmless. Where an item has been established, the data provided on the item is used to calculate a so-called panic point (range gate number) for that target as to when the last minute decision can be made as to whether to sound an alarm or provide braking.

Stated in a different way, if an item has been identified and subsequently comes in on a second range gate (part of the microprocessor design includes a forecast of the next gate in which the target is expected), the range gate number and the count in that range gate is stored under the identified item. These items (range gate number and count) are added to the memory each time they occur for each entry of an item group of the computer memory. The counts that are observed for these range gates as they are accumulated in a memory for a given target are compared to determine whether they are invariant or are changing. This comparison allows the separation of those targets which are far enough off axis so they are not a threat to the vehicle. On the other hand, if the counts are invariant, and if the target appears at a predetermined gate an alarm is sounded.

TABLE II

CHANGE IN COUNT

| RANGE IN FEET | 1 | 5 | 10 | 15 | 20 | 25 | 30 |
|---|---|---|---|---|---|---|---|
| 320 | 0 | 0 | 0 | 0 | 0 | 0 | 0 |
| 300 | 0 | 0 | 0 | 0 | 0 | 1 | 1 |
| 280 | 0 | 0 | 1 | 1 | 1 | 2 | 2 |
| 260 | 0 | 0 | 1 | 1 | 2 | 3 | 5 |
| 240 | 0 | 0 | 2 | 2 | 3 | 5 | 7 |
| 220 | 0 | 0 | 2 | 2 | 4 | 7 | 9 |
| 200 | 0 | 1 | 2 | 3 | 6 | 9 | 13 |
| 180 | 0 | 1 | 3 | 5 | 8 | 13 | 18 |
| 160 | 0 | 1 | 4 | 7 | 11 | 18 | 26 |
| 140 | 0 | 1 | 5 | 9 | 16 | 25 | 37 |
| 120 | 0 | 2 | 7 | 13 | 23 | 40 | 55 |
| 100 | 0 | 2 | 10 | 20 | 36 | 60 | 86 |
| 80 | 0 | 4 | 15 | 33 | 60 | 99 | 148 |
| 60 | 0 | 7 | 27 | 62 | 116 | 198 | 311 |
| 40 | 1 | 15 | 64 | 155 | 316 | 611 | 1225 |
| 20 | 2 | 69 | 240 | 1232 | — | — | — |
|  | 1 | 5 | 10 | 15 | 20 | 25 | 30 |

DISPLACEMENT FROM CENTER LINE IN FEET

Referring now to Table II, this table (derived from the data of Table I) for a stationary object shows the variation or the change in the count from the count of first observation (assumed to be a count of 960 at 320 feet and zero feet off axis) that will be obtained for different amounts of feet off axis at different ranges. For example, at one foot off axis, it will be noted that there is essentially no variation at all as the target gets closer. However, at twenty feet off axis the variation is present after only 40 feet of travel (in the 28th range gate). Similarly, at larger distances off axis, the variation becomes even greater for any given range gate.

Figure 3:
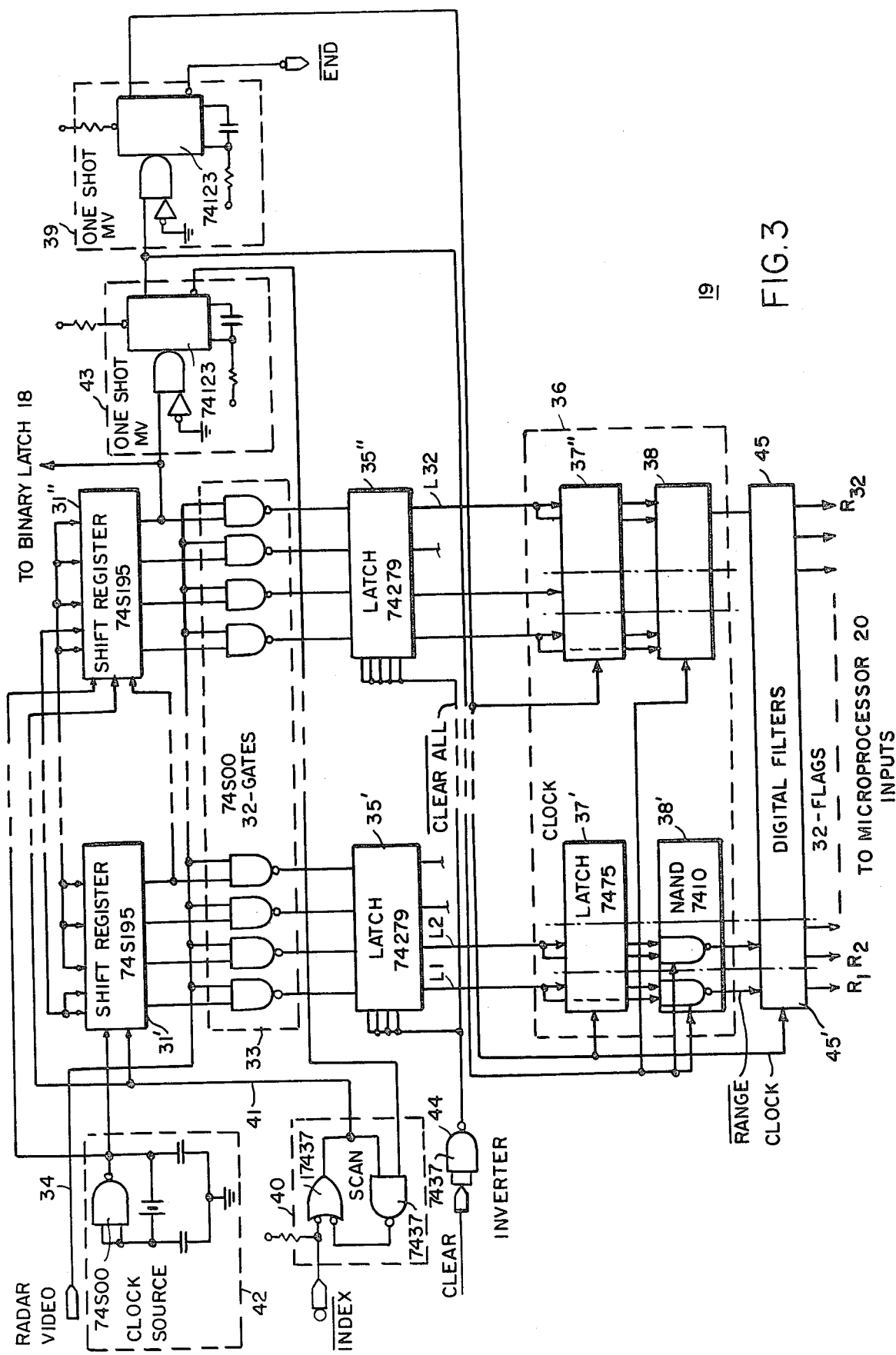
FIG. 3 is a logic diagram of a portion of the digital signal processor.

The pulse generator 16 of FIG. 1 also provides an INDEX pulse to the Digital Signal Processor 19 shown in logic diagram form in FIG. 3 each time that the radar transmits to initiate the processor 19 for the reception and storage of the first and successive range echoes. The INDEX pulse, then, occurs each time the radar is operated or 960 times for each 10 feet of travel. Arrival of the INDEX pulse sets a SCAN flip flop 40. Before the flip flop 40 is set, a LOAD/SHIFT signal on line 41 to a serial connection of eight 4-bit shift registers 31, typically type 74S195, causes a "true" bit to be loaded into the first position of the register 31' and zeros loaded into all other 31 positions. During loading, shifting of registers 31 is inhibited.

When SCAN flip flop 40 becomes set, the register 31 begins to shift by pulses from the 48 MHz clock 42, thereby advancing the "true" bit one stage at a time down the 32 stages. In doing so, the shift register 31 outputs sequentially enables each one of a corresponding set of gates 33, typically type 74S00, at 20 nanosecond intervals (corresponding to a 10 foot range gate). These gates receive, as their second input, the echo video signal 34 from the radar.

This video signal which is reflected from the area ahead of the vehicle is then gated by the 32 gates 33 corresponding to 32 ten foot intervals. The outputs of each gate sets a corresponding latch of the latches 35, typically type 74279 circuits. The output state of each latch appearing on outputs L1 through L32. After the 32nd gate time from the last bit register 31", a one-shot multivibrator 43, a type 74123, is fired to send a pulse which resets the SCAN flip flop 40. At the conclusion of the scan cycle, outputs L1 through L32 denote the presence or absence of targets as a binary 1 or 0 in each of the 32 range intervals.

After the end of a scan cycle, the contents of each range interval of latches 35 are transferred into corresponding latches 37 (typically 7475 latches) just before the latches 35 are cleared by a $\overline{CLEAR}$ pulse from the microprocessor 20 through inverter 44. Therefore, when data on the next scan is received in the latches 35, the data on the previous scan is being stored in the latches 37. The outputs of L1, L2 . . . L32 of each latch 35 and the corresponding outputs of the latches 37 are provided as two inputs of a three input type 7410 NAND gates 38. Latches 37 and Gates 38 operating in conjunction with the outputs of latches 35 comprise the comparators 36 of FIG. 2. The third input of the gates 38 is obtained from one output of a type 74123 one shot MV 43 whose other output is used to clear or reset the SCAN flip flop 40. Therefore, on each scan each bit L1, L2, . . . L32 stored in latches 35 is compared in a NAND gate 38 with the corresponding bit of the previous scan for that range stored in latch 37 and therefore the output of the gates 38 will represent the coincidence of the two transmitter beams A and B on the target. If the target is not in both transmitters, there will be no output from the gate 38 since there will be an absence of signal in either latch 35 or 37. In order to transfer the data in latch 35 and since the NAND gates 38 are sampled right after completion of a scan, a slight delay is provided by second type 74123 one shot MV 39 which transfers the data stored in latch 35 to the latch 37 to be used on the next scan.

The output signals of gates 38 ($\overline{RANGE}$) corresponding to each range interval are provided as corresponding $\overline{RANGE}$ input signals to each digital filter 45' of the 32 digital filters 45. The purpose of the digital filter 45' is to establish a FLAG output signal which is "up" when a predetermined number of $\overline{RANGE}$ signals indicating the presence of a target in both transmitting beams A and B, occur during a predetermined number of system pulses (clock pulses) from pulse generator 39. The FLAG output signal goes down when the number of $\overline{RANGE}$ signals falls below the predetermined number.

Figure 4:
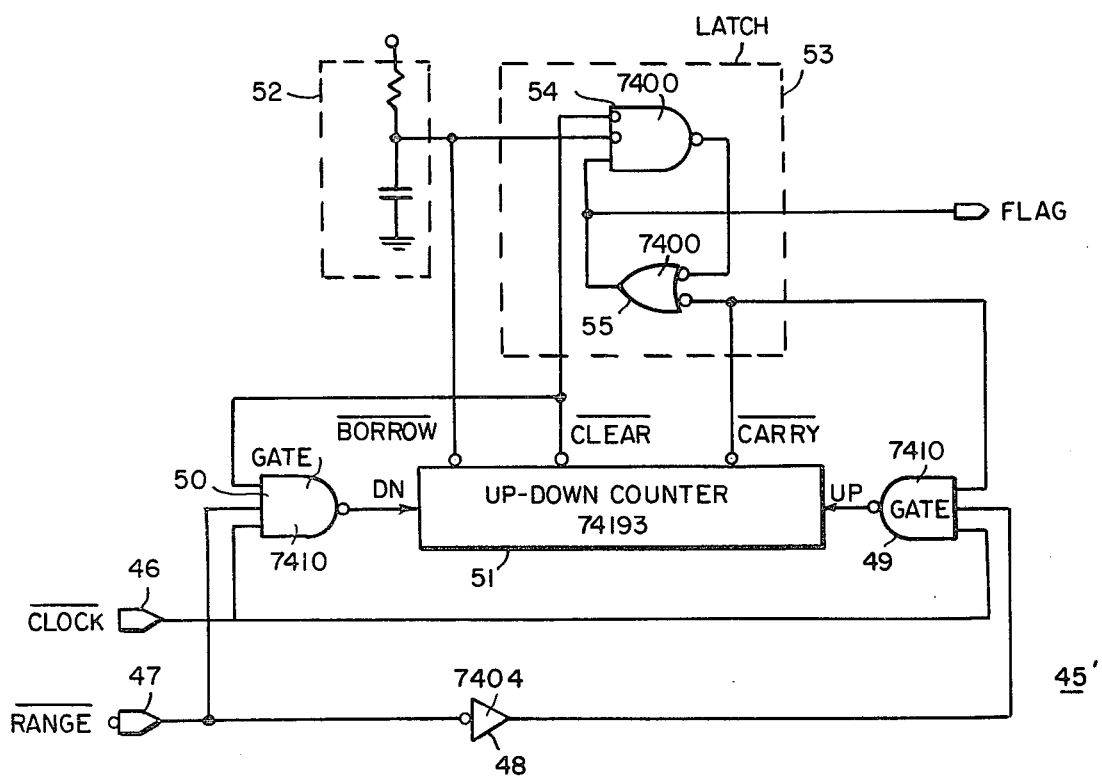
FIG. 4 is a logic diagram of the digital filter portion of the digital signal processor.

The digital filter 45' shown in FIG. 4 has two inputs, a clock input 46 and a range input 47. The range input signal is $\overline{RANGE}$ (meaning the output of a gate 38 will go from logic 1 to logic 0 when a target is discovered in both beams A and B). An inverter 48 feeds one gate 49 whereas $\overline{RANGE}$ feeds a second gate 50 directly. The gate 50 output operates the "down" count of a counter 51. Whereas the gate 49 which is feed by $\overline{RANGE}$ inverted, (range "true"), operates the "up" input to the counter, typically a 74193 decade counter.

When the power is first turned on, an RC network 52 causes the flag latch 53 to be reset and also resets the up/down counter 51. The flag latch 53 consists of two NAND gates 54 and 55. When there is a RANGE signal in the output of particular $\overline{RANGE}$ gate 38 to which the filter 45' is connected, the $\overline{RANGE}$ signal on line 47 and clock pulses on line 46 cause the up/down counter 51 to count up. The counter 51 will continue to count up until a $\overline{CARRY}$ output occurs. $\overline{CARRY}$ output operates the NAND gate 55 to "set" the flag latch 53. $\overline{CARRY}$ also closes the NAND gate 49 so that further upcounting cannot occur. However, the up/down counter 51 in the absence of a $\overline{RANGE}$ signal in the range, will now start to count down and after ten counts will count down and generate a $\overline{BORROW}$. $\overline{BORROW}$ comes up and "resets" the flat latch 53 and also closes the gate 50 so that no further down counting can occur. As long as there is a count in the counter 74193 (i.e., when it is counting down or up after reaching its maximum count), the output flag will be "true", but as soon as it is counted all the way down to the bottom, a $\overline{BORROW}$ output is generated the flag output will go "false" and remain "false" until the maximum count is again readied.

The effect of the "true" or "false" state of the $\overline{FLAG}$ on the pulse count for that range interval as stored in the microprocessor 20 register has been previously explained.

The multi-vibrator 39 provides an output signal $\overline{END}$ to the microprocessor to indicate that data is ready to be read into the microprocessor, to interrupt any processing which is taking place, and to cause the 32 $\overline{FLAG}$ bits from digital filter 45 to be applied as an input to the microprocessor. After read-in, a computer output line CLEAR clears the contents from the latches 35 to put them into condition for receiving signals from the next transmitted radar pulse.

Figure 5:
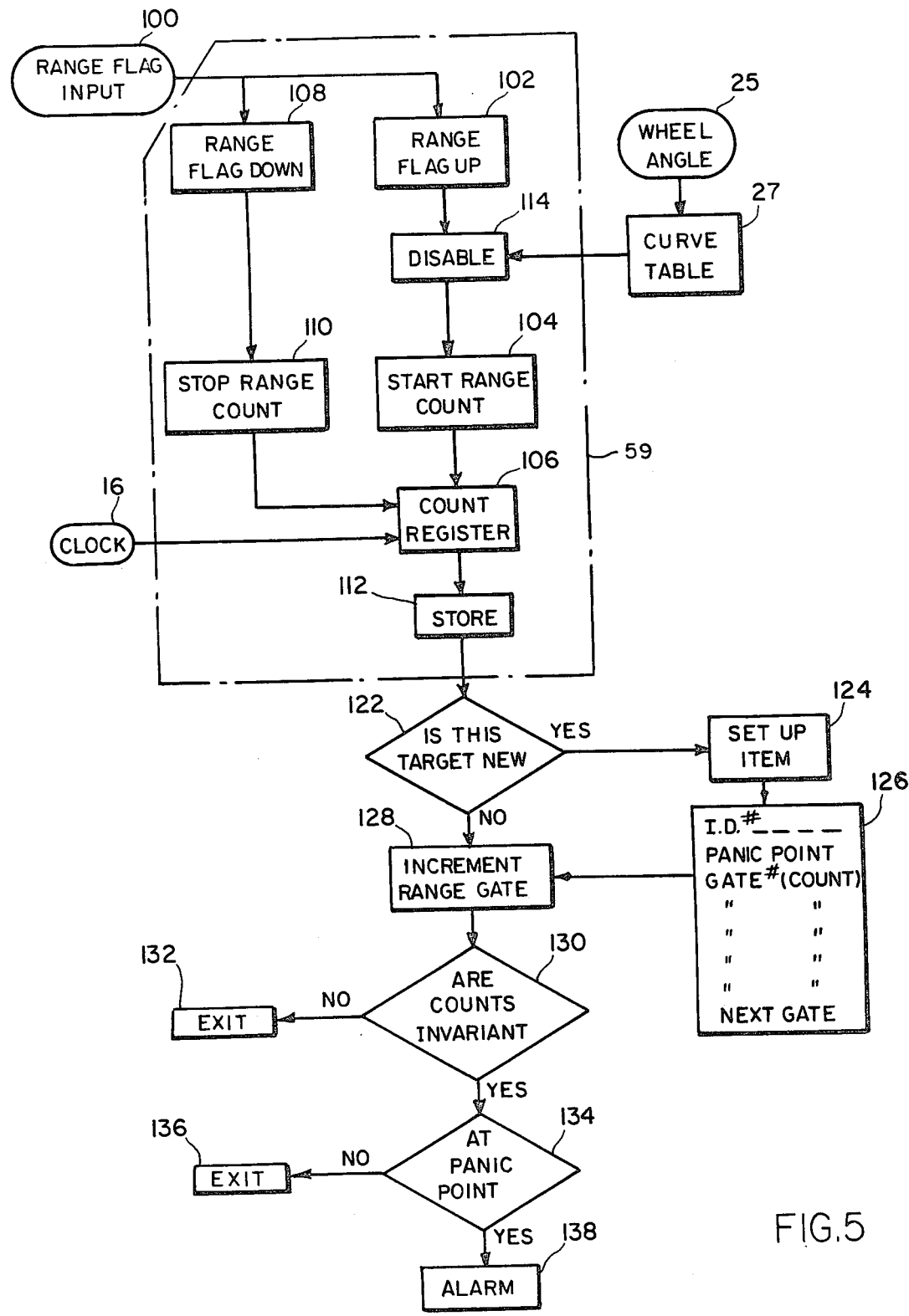
FIG. 5 is a flow diagram for the processing of received range gated signals in the microprocessor.

A flow diagram for the microprocessor is shown in FIG. 5. FIG. 5 presents in flow diagram form the explanation of the manner in which target signals are processed in the microprocessor which has been previously presented.

As discussed above, the $\overline{END}$ signal from one-shot 39 indicates that data is ready to be read into the microprocessor and interrupts any processing which is taking place, so that the 32 $\overline{FLAG}$ bits from digital filters 45 may be read by the microprocessor, as indicated by block 100.

Each individual flag is handled by the processor to determine whether that flag is up or down. When the processor detects that a flag has gone up, block 102, a range count is started, block 104, to accumulate pulses from the system clock 16 in a range count register 106 in the microprocessor which corresponds to that particular range. Processor 20 continues to accumulate counts, block 106, until the processor detects that the range flag has gone down, block 108. At this point, the range count stops, block 110. When the range count stops, the information from the range counter is transferred to a temporary store, block 112. The number which is accumulated in the range counter register will be a function of a velocity of the target which was detected in that range.

The processor also receives information from a table memory 27. The table memory 27 contains information which is used in conjunction with wheel angle information 25 to determine how far the range is useful when negotiating a curve. When the automobile is on a curve the receiving antenna boresight crosses the center line of the road at a range dependent on the sharpness of the curve and information beyond that range is not used in the detection system. The received information is stored in a table and the wheel angle information provides an address in that table which directs the processor to ignore all data beyond the range gate where the boresight crosses the center of the road, block 114.

The programing of the microprocessor provides that the processing contained with dashed line 59 be performed for each of the 32 range gate outputs R1, R2, . . . R32.

The foregoing has been concerned with the processing of the data for individual range gates. The next step in the process is to identify targets and to track the targets through the range gates as a means of determining whether the apparent target is a threat or not and whether or not it is necessary to sound an alarm. The processor first determines if the target is a "new" target, block 122. If so, the microprocessor establishes the target as an "item" in a section allocated to an item of microprocessor memory, block 124. The range gate and count in that range are stored as "first" data under that item, and the microprocessor on the basis of the "first" data makes a prediction of a range gate or gates and/or the count in each gate, block 126.

This prediction is compared with a subsequently received range gate number and count. If from this range and count it is determined in block 122 that it is not "second" data on an already established item, a "second" item is established in a portion of the microprocessor memory and used for prediction and analysis of data associated with it to determine its status as a threat or as harmless. Where an item has been established, the data provided on the item is used to calculate a so-called panic point (range gate number) for that target as to when the last minute decision can be made as to whether to sound an alarm or provide braking, block 126.

If an item has been identified and subsequently comes in on a second range gate, the processor proceeds from block 122 directly to block 128; and the range gate number and the count in that range gate are stored under the identified item. These items (range gate number and count) are added to the memory each time they occur for each entry of an item group of the computer memory, block 128.

The counts that are observed for the range gates as they are accumulated in a memory for a given target are then compared to determine whether they are invariant or are changing, block 130. This comparison allows the separation of those targets which are far enough off-axis so they are not a threat to the vehicle. On the other hand, if the counts are invariant, and if the target appears at the panic point, block 134, an alarm is sounded, block 138. Thus the flow diagram shows that the count and range information is processed by programing the computer to establish an identity for each target (an item), to predict a "panic point" range gate at which an alarm or braking is to occur, to store and process for each item the sequence of range gates and the count in each range gate to make the decisions with respect to whether the item is a threat or not and at what point action must be taken, if any, to avoid a collision, prediction of the next gate in which the item should appear to distinguish the item from other targets for which different items should be established.

Although the invention has been described in terms of two overlapped transmitting antennas, it will be apparent to those skilled in the art that a single antenna of sufficiently narrow bandwidth will function to sort out off-axis targets and the A beam–B beam coincidence used in the preferred embodiment would thus not be necessary. Similarly, although radar has been used in the preferred embodiment, other apparatus for receiving reflected pulsed signals from targets such as a laser source of radiation are available for use in the invention.

It is evident that those skilled in the art, once given the benefit of the foregoing disclosure, may make numerous other uses and modifications of, and departures from the specific embodiments described herein without departing from the inventive concepts. Consequently, the invention is to be construed as embracing each and every novel combination of features present in, or possessed by, the apparatus and techniques herein disclosed and limited solely by the scope and spirit of the appended claims.

We claim:

1. A system using a reflected energy signal from an irradiated object to determine whether a moving vehicle and said object are on a collision course and to provide a warning of an impending collision, the system comprising:
   transmitter means for irradiating said object with first and second over-lapping pulsed radiant energy beams,
   means for comparing reflected signals from the first and second beams and for providing pulses upon detection of reflected signals from said object from both beams,
   means for periodically determining from said pulses the relative velocity and distance of said object with respect to said vehicle, for storing said periodically-determined relative velocity and distance to provide a table of relative velocity and distance, and for determining from said stored table of relative velocity and distance whether the vehicle and object are on a collision course to provide a warning signal at a time sufficient to prevent a collision if said object is determined to be in the path of the vehicle.

2. For use with a vehicle of the type having a pulsed radar, including a transmitter means, which periodically transmits a signal in the path of the vehicle, receives echoes of the transmitted signal reflected from objects in the path of motion of the vehicle, and provides an output signal representative of the received echoes, a collision avoidance system for determining the presence of an object in the path of the vehicle, comprising;
   means for defining a first plurality of successive range gate times representative of a corresponding first plurality of adjacent range gate intervals extending in the path of motion of the vehicle, and including means responsive to the radar output signal for providing a like first plurality of range gate signals, each corresponding to a respective range gate interval and each indicative of the presence or absence of an object in the corresponding range gate interval in the path of the vehicle,
   means for proving system pulses at a rate proportional to the speed of the vehicle; and
   processing means, responsive to the system pulses and to the range gate signals, for determining and storing the number of system pulses produced while a detected object is in each range gate interval for each range gate interval passed through by the detected object, and for comparing the stored numbers of pulses with data representative of pulse counts produced by objects laterally displaced from the path of the vehicle to determine if the variation in the stored numbers of pulses is a variation which would be produced by an object laterally displaced from the path of the vehicle to provide a warning signal when a detected object is not determined to be laterally displaced from the path of the vehicle by the time that the distance between a detected object and the vehicle becomes less than a predetermined threshold distance.

3. For use with a vehicle of the type having a pulsed radar, including a transmitter means, which periodically transmits a signal in the path of the vehicle, receives echoes of the transmitted signal reflected from objects in the path of motion of the vehicle, and provides an output signal representative of the received echoes, a collision avoidance system for determining the presence of an object in the path of the vehicle, comprising;
   means for defining a first plurality of successive range gate times representative of a corresponding first plurality of adjacent range gate intervals extending in the path of motion of the vehicle, and including means responsive to the radar output signal for providing a like first plurality of range gate signals, each corresponding to a respective range gate interval and each indicative of the presence or absence of an object in the corresponding range gate interval in the path of the vehicle;
   means for providing system pulses at a rate proportional to the speed of the vehicle;
   processing means, responsive to the system pulses and to the range gate signals, for determining and storing the number of system pulses produced while a detected object is in each range gate interval, for each range gate interval passed through by the detected object and for comparing the stored number of pulses to determine if the numbers of pulses are invariant;
   said processing means being further operative to provide a warning signal when the stored numbers of pulses produced by a detected object are determined to be invariant at the time that the distance between a detected object and the vehicle becomes less than a predetermined threshold distance.

4. The system of claims 1, 2, or 3 comprising in addition,
   trigger means for providing a trigger pulse for each predetermined distance of travel of said vehicle; and
   wherein said transmitter means includes means for activating said transmitter means in response to each trigger pulse from the trigger means.

5. The system of claim 4 wherein said trigger means further includes means for providing pulses which are randomly jittered by an amount sufficient to substantially reduce interference from the radiation of a second system.

6. The system of claims 2 or 3 wherein the process means if further operative to calculate the threshold distance as a function of the relative velocity between the detected object and the vehicle.

7. A system using reflected energy from an irradiated object to determine whether a moving vehicle and said object are on a collision course to prevent a collision by providing a warning signal, comprising:
   transmitter means for periodically transmitting electromagnetic radiation in front of said vehicle;
   means for receiving radiation signals reflected from said object;
   means, responsive to the received signals reflected by said object, for determining the relative distance of said object with respect to said vehicle; and
   means for periodically determining the velocity of the object relative to the vehicle at times corresponding to a predetermined change in distance between said object and said vehicle, for storing said relative velocity at each of said times, and for determining from said stored velocities whether said vehicle and object are on a collision course to provide a warning signal when said distance between said vehicle and object is less than the stopping distance of the vehicle, determined as a function of the relative velocity.

8. A method for providing a warning to the driver of a moving vehicle to avoid a collision with an object, the method comprising the steps of:
periodically transmitting an electromagnetic signal in the path of motion of the vehicle;
receiving electromagnetic signals reflected from an object;
determining from said received signals the presence of an object in each of a plurality of adjacent range gate intervals extending in the path of motion of the vehicle and producing a like plurality of range gate signals, each range gate signal being associated with a respective one of the range gate intervals and being representative of the presence or absence of an object in the associated range gate interval;
identifying an object represented by a range gate signal and associating range gate signals produced by the identified object with that object as it moves from one range gate interval to an adjacent range gate interval;
periodically determining and storing the relative velocity with respect to the vehicle of an identified object as it moves from one range gate interval to another;
determining an alarm range gate interval at which to provide an alarm signal as a function of the relative velocity; and
providing the warning signal if the stored relative velocities are invariant at the time a detected object reaches the alarm range gate interval.

9. A method for detecting an impending collision between a moving vehicle and an object comprising the steps of:
producing clock pulses as the vehicle moves such that each clock pulse represents movement of the vehicle by a predetermined distance;
periodically transmitting an electromagnetic signal in the path of motion of the vehicle in response to the clock pulses;
receiving echoes produced by reflections of the transmitted signal by an object, the received signals representing the relative distance from the vehicle of such an object;
determining from said received signals the presence or absence of an object in each of a first plurality of range gate intervals located in the path of motion of the vehicle and adjacent to one another and producing a similar first plurality of range gate signals, each associated with a respective one of the range gate intervals and representative of the presence or absence of an object in the associated range gate interval;
counting and storing the number of clock pulses produced while an object is in a range gate interval for each range gate interval in which the object is detected; and
discriminating between an object which is in the path of motion of the vehicle and an object which is outside the path of motion of the vehicle based on said stored numbers of clock pulses.

10. The method of claim 9 wherein the step of discriminating comprises the steps of:
storing data representative of the number of clock pulses produced during each range gate interval by objects laterally displaced from the path of motion as such objects proceed through each of the range gate intervals;
determining from the stored numbers of clock pulses a threshold distance at which action must be taken to prevent a collision between the vehicle and the detected object; and comparing the stored numbers of clock pulses with the stored data to determine whether the stored numbers are indicative of a laterally displaced object, and
producing a warning signal in response to stored numbers of clock pulses which are not indicative of a laterally displaced object at the time that the distance between the vehicle and the object becomes less than said threshold distance.

* * * * *